UNITED STATES PATENT OFFICE.

WILLIAM POLATSIK, OF CHICAGO, ILLINOIS, ASSIGNOR TO HIMSELF AND JOSEPH L. BLOOM, OF CHICAGO, ILLINOIS.

PROCESS FOR PRODUCING WHALEBONE OR RUBBER SUBSTITUTES.

No. 820,315.    Specification of Letters Patent.    Patented May 8, 1906.

Application filed August 18, 1905. Serial No. 274,773.

*To all whom it may concern:*

Be it known that I, WILLIAM POLATSIK, a subject of the Emperor of Austria-Hungary, residing at Chicago, in the county of Cook and State of Illinois, have invented certain new and useful Improvements in Processes for Producing Whalebone or Rubber Substitutes; and I do hereby declare the following to be a full, clear, and exact description of the invention, such as will enable others skilled in the art to which it appertains to make and use the same.

My invention relates to a novel process for transforming certain animal waste into an elastic mass similar in its properties to whalebone and hard rubber, the object being to provide a relatively cheap and rapid process for the accomplishment of the result above set forth; and it consists in the various steps hereinafter fully described and claimed.

My invention relates more particularly to a process for treating certain waste products of packing-houses, such as the non-fatty waste parts—as, for example, ligaments and tissues.

My process consists in first eliminating from the waste all fats and fatty substances, such as glue, gelatin, or gelatinous matter. This is most readily accomplished by placing the said waste in a bath consisting approximately of water, by weight, eighty parts; acetate of lime, four parts. This bath is sufficient to treat about one hundred parts of the animal matter, which is allowed to remain immersed therein for a period of forty-eight hours, more or less. When removed from the said bath, the waste is practically white and entirely free from fat, glue, or gelatin. The said waste is then placed in a second bath consisting approximately of water, by weight, eighty parts; chlorid of strontium, two parts. In this the material is immersed, the second bath being also rendered acid by the chlorid of strontium. To this bath is added, after the chlorid of strontium is fully dissolved, about one part, by weight, more or less, of sulfate of iron. The sulfate of iron has the effect of shrinking the waste, so as to cause the fibers to be close to each other. After remaining in the last-named bath for forty-eight hours, more or less, the strips of material are stretched upon boards either isolated from each other or in contact and are compressed thereon by hydraulic pressure of four hundred pounds to the square inch, more or less, and are allowed to dry in the presence of the pressure thus maintained. Those strips which are in contact with each other are caused to cement themselves together under the action of the applied pressure so firmly as to produce a substantially homogeneous mass either in strips, sheets, or blocks. These are afterward trimmed as desired.

The finished products are normally of about the color of rosin, but may be dyed to any desired color by introducing anilin dyes in the chlorid-of-strontium bath.

The finished product is extremely hard, tough, and elastic and affords an excellent and relatively cheap substitute for whalebone, hard rubber, and similar materials. The resulting product is capable of being readily polished and is generally of great utility.

I claim as my invention—

1. The herein-described process of treating animal waste which consists primarily in immersing said waste in a bath consisting of water and acetate of lime, for a period of forty-eight hours more or less, then immersing said waste in a bath consisting of water and chlorid of strontium having sulfate of iron added thereto, for a period of forty-eight hours more or less, then stretching said waste over boards and drying the same in the presence of mechanically-applied high pressure.

2. The herein-described process of treating animal waste which consists primarily in subjecting said waste to the action of an acidulous calcic bath to eliminate the fatty constituents, then subjecting said defatted waste to the action of dilute chlorid of strontium and iron sulfate, then stretching the same, and drying the same under compression.

3. The herein-described process of treating animal waste which consists in first subjecting said waste for a period of forty-eight hours, more or less to the action of a dilute acidulous calcic bath, then subjecting the same for a similar period to the action of dilute chlorid of strontium and sulfate of iron, and subsequently drying and compressing the same.

4. The herein-described process of treating animal waste which consists in first immersing one hundred parts by weight thereof in a solution consisting approximately of eighty parts by weight of water and four parts acetate of lime, for a period of forty-eight hours more or less, then subjecting said waste for a period of forty-eight hours more or less to the action of two parts by weight chlorid of strontium dissolved in eighty parts water and having one part, more or less, of sulfate of iron added thereto, and subsequently drying the resulting product under compression.

In testimony whereof I have signed my name in presence of two subscribing witnesses.

WILLIAM POLATSIK.

Witnesses:
RUDOLPH WM. LOTZ,
CHARLES S. FRANK.